| United States Patent [19] | [11] | Patent Number: | 4,975,497 |
|---|---|---|---|
| Tate et al. | [45] | Date of Patent: | Dec. 4, 1990 |

[54] RUBBER COMPOSITIONS CONTAINING FURAZAN OXIDES AND TRANSITION METAL SALTS

[75] Inventors: David P. Tate, Akron; Daniel F. Graves, Clinton, both of Ohio

[73] Assignee: Bridgestone/Firestone, Inc., Akron, Ohio

[21] Appl. No.: 273,650

[22] Filed: Nov. 18, 1988

Related U.S. Application Data

[63] Continuation of Ser. No. 653,656, Sep. 21, 1984, abandoned.

[51] Int. Cl.$^5$ .......................... C08C 19/26; C08C 4/00
[52] U.S. Cl. .................................. 525/375; 524/495;
525/329.3; 525/331.1; 525/332.6; 525/332.9;
525/332.7; 525/347; 525/370; 525/377
[58] Field of Search ............... 525/347, 370, 375, 377,
525/381; 524/496, 87, 89, 91, 92, 94

[56] References Cited

U.S. PATENT DOCUMENTS

| 2,424,199 | 7/1947 | Ter Horst . | |
|---|---|---|---|
| 2,905,582 | 9/1959 | Coleman . | |
| 2,974,120 | 5/1961 | Miller | 524/95 |
| 3,528,098 | 9/1970 | Shaw . | |
| 3,931,106 | 1/1976 | Crosby | 525/375 |
| 3,931,121 | 7/1976 | Davis . | |
| 4,024,327 | 5/1977 | Diefenbach | 525/375 |
| 4,185,018 | 1/1980 | Tah | 548/126 |
| 4,454,280 | 6/1984 | Lawson | 524/398 |
| 4,518,733 | 5/1985 | Ishikawa | 524/274 |
| 4,557,306 | 12/1985 | Graves | 152/548 |
| 4,572,263 | 2/1986 | Ogawa | 152/537 |
| 4,778,857 | 10/1988 | Graves | 525/375 |

FOREIGN PATENT DOCUMENTS

| 0036456 | 9/1981 | European Pat. Off. . |
|---|---|---|
| 2534400 | 2/1977 | Fed. Rep. of Germany . |
| 2368515 | 5/1978 | France . |
| 102231 | 8/1977 | Japan . |
| 133931 | 11/1977 | Japan . |
| WO83/04031 | 11/1983 | PCT Int'l Appl. . |
| 993045 | 5/1965 | United Kingdom . |
| 1586861 | 3/1981 | United Kingdom . |

OTHER PUBLICATIONS

Rehner, Jr. et al., Vulcanization Reaction in Butyl Rubber, Ind. & Eng. Chem., 38, pp. 500–506.
Rubber Chem. & Tech. 49, p. 1019 (1976).
Tonka, Kogyo Kagah Zasshu 74(8), 1701–6.

*Primary Examiner*—Christopher Henderson
*Attorney, Agent, or Firm*—Daniel N. Hall

[57] ABSTRACT

Modified rubber compositions are described which comprise at least one polymer rubber containing carbon-carbon unsaturation, at least one aromatic furazan oxide, and at least one hydrocarbon-soluble transition metal salt. When a transition metal salt is included in such polymer rubber formulations containing aromatic furazan oxides, the undesirable odors which normally characteristic of such rubber formulations is diminished or eliminated without significantly reducing the other desirable characteristics of the vulcanized rubbers. For example, filled vulcanizates made by vulcanizing mixtures in accordance with the invention exhibit high rebound, and tires which are formulated to include at least a portion of the cured vulcanizates in the tread exhibit reduced rolling resistance. Preferably, the hydrocarbon-soluble transition metal salts are the aliphatic or alicyclic monocarboxylic acid salts or cobalt, iron, nickel or manganese.

29 Claims, No Drawings

RUBBER COMPOSITIONS CONTAINING FURAZAN OXIDES AND TRANSITION METAL SALTS

This a continuation of co-pending application Ser. No. 653,656 filed on Sept. 21, 1984, now abandoned.

BACKGROUND OF THE INVENTION

This invention relates to uncured furazan oxide modified rubbers, to improved methods of processing said rubbers to rubber compositions containing said rubbers, and to methods for reducing the rolling resistance of tires. More particularly, the present invention relates to a process for improving the properties and reducing the undesirable odor of rubber compositions containing aromatic furazan oxides, and to filled vulcanizates made by vulcanizing mixtures of said rubber compositions and reinforcing fillers.

It is known that rubber compositions generally are combined or "compounded" with various other materials before being cured and/or put into use. Some of these added materials improve the properties of the end product in service while others improve processing properties of the uncured compositions. In some instances, both effects may be achieved. It is also known that the various chemicals, pigments and other materials so used, both organic and inorganic, can interact in various ways to produce desirable or deleterious effects. For further discussions of rubber processing and materials used therein, see, for example, *Encyclopedia of Polymer Science and Technology*, published by John Wiley and Sons, New York (1970), particularly Vol. 12, page 280 and *The Vanderbilt Rubber Handbook*, R.T. Vanderbilt Company, Norwalk, Conn., 06855 (1968), particularly Sections 6, 7, 8, 9 and 11.

Vulcanizing agents, plasticizers, extenders, fillers, pigments, etc. generally are incorporated into vulcanizable rubber compositions so that the rubber can be cured or vulcanized in a mold to form useful articles. It often is necessary to include processing aids in rubber compound prior to molding and curing. These processing aids are primarily intended to improve the mixing of the ingredients of the rubber compound, the processability of the rubber during processing, the mold or mill release properties of the rubber, tack and green strength without seriously adversely affecting the properties of the cured rubber.

Carbon blacks are used in rubber formulations and vary widely as to their characteristics and effects on rubber formulations. In rubber formulations, carbon black is used as a reinforcing filler. Many carbon blacks of the channel and furnace types with varying characteristics have been utilized because they impart varying desirable characteristics to the rubber.

Benzofurazan oxides, and their analogs and isomers are known compounds, and many descriptions of them and procedures for their preparation have appeared. See, for example, Kaufman et al, "Chemical Reviews", Vol. 59, page 429 and following (1959) and Mallory et al, *Organic Synthesis* collective Vol. IV, pp. 74 and 75, John Wiley and Sons, New York (1963). The following U.S. patents also describe procedures for preparing furazan oxides of various types: U.S. Pat. No. 4,185,018 to Fah; U.S. Pat. No. 3,528,098 to Shaw; and U.S. Pat. No. 2,424,199 to Ter Horst. In considering previous descriptions of furazan oxides and related compounds, it should be noted that nomenclature used for these compounds has not been consistent, in part due to uncertainty as to their structures and predominant isomeric form. For example, they have been described as furazan oxides, as ortho dinitroso benzenes or di(nitrile oxides), isobenzofuroxans, benzofuroxans, benzofurazan-N-oxides and benzofurazan oxides. It is believed that the latter term is the modern and preferred nomenclature, and it shall be used in this specification and the appended claims.

Studies of furazan oxides and related compounds in rubber have been reported. For example, Rehner and Flory have indicated in *Industrial and Engineering Chemistry*, Vol 38, page 500 et sec, that ortho dinitroso benzene is inactive in butyl rubber as a vulcanizing agent. In contrast, the para isomer is said to be very active. U.S. Pat. No. 3,931,121 to Davis et al, describes the curing of elastomeric polymers with poly(chloronitroso) compounds. U.S. Pat. No. 3,931,106 to Crosby et al, describes the use of dinitrile oxides, (generated in situ from furazans), in rubber cross-linking.

British Patent No. 1,586,861 describes the use of organic compounds which are sources of adjacent nitroso groups on a six-membered aromatic ring for modifying polymeric materials containing carbon-carbon unsaturation. Examples of such polymeric materials include polybutadiene, styrene-butadiene copolymers, butyl rubber, natural rubber and EPDM rubbers. The polymeric materials can contain fillers such as carbon black and fumed silica. Benzofurazan oxide is an example of a source material for the adjacent nitroso groups. The patentees suggest that the furazan oxide can be mixed with the polymeric material using conventional rubber mixing techniques or other conventional plastics or paints technology followed by heating of the mixture to effect modification of the polymer, e.g., cross-linking of the polymer. The common rubber additives may be mixed into the polymer before reacting it with the furazan oxide.

Rubber stocks containing aromatic furazan oxides such as benzofurazan oxide have a sweet odor that can be rather strong and unpleasant. The odor persists even in the vulcanized product. This odor problem can be a severe problem to the use of the furazan oxides in tire stock and treads, not only in the processing of the green stock, but also in the storage of the cured tires. The cause of this strong odor is not known with certainty, but one possible cause may be the conversion of the aromatic furazan oxide to an aromatic furazan.

U.S. Pat. No. 2,974,120 to Miller describes the use of nonaromatic furoxans as antioxidants and antidegradants in rubber. U.S. Pat. No. 2,905,582 to Coleman et al, describes the use of nitroso compounds, including dinitroso compounds wherein the nitroso groups are on nonadjacent carbons in a method for bonding polyurethane resin to rubber bodies. Morita has described the use of N,4-dinitroso-N-methyl aniline as an active chemical promoter for carbon black reinforcement of IIR, NR and SBR. See *Rubber Chemistry ,and Technology*, Vol. 49, page 1019 and following (1976). Tanaka et al, have reported studies of nitroso benzene in rubber where chain cleavage was observed in Kogyo Kagaku Zasshi 74(8), pages 1701-6 (1971).

SUMMARY OF THE INVENTION

It now has been found that modified rubber compositions can be prepared containing aromatic furazan oxides which do not have the strong odors previously observed. More particularly, the modified rubber compositions are obtained by (a) preparing a mixture comprising (i) at least one uncured polymer rubber containing an unsaturated carbon chain, (ii) at least one furazan oxide of the partial formula

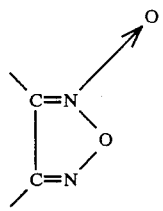
(I)

wherein the depicted carbon atoms are part of a single fused aromatic ring, and (iii) an odor-reducing amount of at least one transition metal salt, and (iv) at least one reinforcing filler, and (b) mechanically compounding the mixture at a temperature of up to about 200° C. The uncured rubber compositions of the invention do not have the strong characteristic odor of furazan or furazan oxide which facilitates handling and storage of these materials.

The invention also includes filled vulcanizates made by vulcanizing a composition comprising at least one of the above-described uncured rubber compositions. Rubber articles and portions thereof made from such vulcanizates such as tires, hoses, belts, treads, sidewalls and the like are also within the scope of the present invention as well as methods of reducing the rolling resistance of such tires.

DETAILED DESCRIPTION OF THE INVENTION

The rubber compositions in the first embodiment of this invention are not cured. In other words, they are not vulcanized. The unvulcanized compositions are prepared by a process for improving the properties of uncured polymer rubber formulations containing aromatic furazan oxides which comprises (a) preparing a mixture comprising (i) at least one uncured polymer rubber containing an unsaturated carbon chain, (ii) at least one furazan oxide of the partial formula

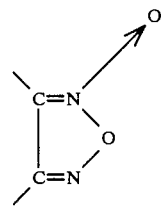
(I)

wherein the depicted carbon atoms are part of a single fused aromatic ring, (iii) an odor-reducing amount of at least one transition metal salt, and (iv) at least one reinforcing filler, and (b) mechanically compounding the mixture at a temperature of up to about 200° C.

The rubbers used herein contain carbon-carbon unsaturation in the molecular structure and these rubbers include natural as well as synthetic rubbers. The rubber compositions used in the present invention include natural rubber and rubber-like polymers produced by polymerizing aliphatic, conjugated diolefins, especially those containing 4 to 8 carbon atoms per molecule such as butadiene, isoprene, pentadienes, etc., or the copolymers of such dienes. The rubbers used in the uncured compositions of this invention have unsaturated carbon chains. That is, their polymer backbones contain a significant amount of unsaturation, in contrast to the pendant or vinyl saturation found in some other types of rubbers. Typically, the chains of such unsaturated rubbers have at least about 50% of their carbon-to-carbon bonds as unsaturated bonds. Characterization of rubber as having unsaturated carbon chains is well known in the art as shown by ANSI/ASTM Standard D 1418-79A where unsaturated-chain rubbers are referred to as R rubbers. Class R rubbers include natural rubber and various synthetic rubbers derived at least partly from diolefins. The following is a non-exclusive list of R class rubbers which can be used in the compositions of the present invention:

ABR—Acrylate-butadiene
BR—Butadiene
CIIR—Chloro-isobutene-isoprene
CR—Chloroprene
IR—Isoprene, synthetic
NBR—Nitrile-butadiene
NCR—Nitrile-chloroprene
NIR—Nitrile-isoprene
NR—Natural rubber
SBR—Styrene-butadiene
SCR—Styrene-chloroprene
SIR—Styrene-isoprene rubbers Of these, the NR, IR, BR, SBR or mixtures of two or more of these are typically used. BR and SBR are preferred. Many compositions are made wherein the rubber is NR, SBR or a mixture containing at least about 50% of one of these. Compositions containing only NR as the rubber portion are often used. In the context of this invention, NR includes both hevea and guayule rubber as well as mixtures thereof.

The rubbers used herein having carbon-carbon unsaturation also may be other than the R rubbers such as EPDM. EPDM rubbers are derived from ethylene-propylenediene monomer and generally about 3-8% of their carbon bonds are unsaturated bonds.

The furazan oxides used in preparing the uncured rubber compositions of this invention are fused aromatic, that is, they have an aromatic ring fused to the N-oxidized heterocyclic furazan ring. They are of the partial formula

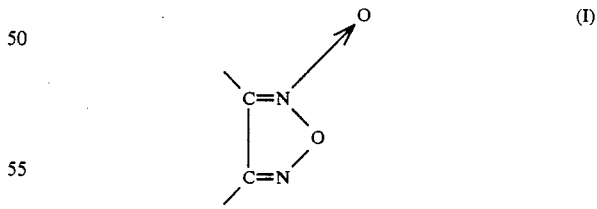
(I)

wherein the depicted carbon atoms are part of a fused, single aromatic ring. This aromatic ring can be carbocyclic such as a benzene ring or it may be heterocyclic, such as a pyridine ring. It can be the only additional ring in the furazan compound, or it can be part of a linked or fused ring system. It is only necessary that both of the depicted carbon atoms are part of the same aromatic ring.

Preferred examples of the furazan oxides within the scope of Formula I useful in preparing the uncured rubber compositions of this invention are those that can be represented by the Formulae II–V.

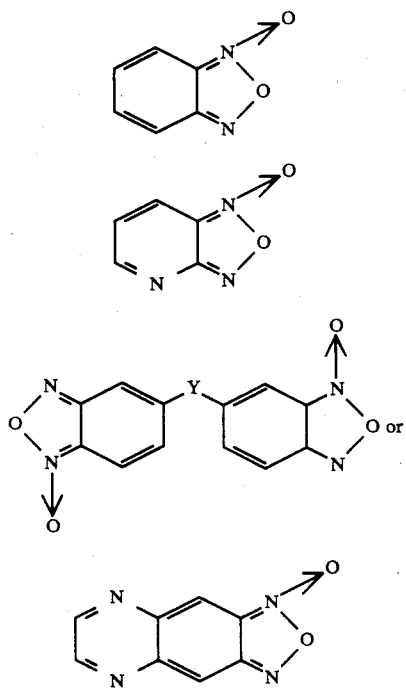

wherein none, one or any two of the ring positions can be substituted with lower hydrocarbyl, halogen, hydroxyl, lower hydrocarbyloxy, lower hydrocarbylthio, lower hydrocarbyl carbonyl, carbonyl lower hydrocarbyloxy, nitro, amino or amine groups and Y is a linking atom or group. In this context, lower hydrocarbyl refers to groups containing carbon and hydrogen having 8 or less carbon atoms such as methyl, ethyl, butyl, pentyl, heptyl, octyl (all isomers). Linking atoms or groups Y include ether, thio ether, sulfoxide, sulfone, amine, methylene and the like (including a simple covalent bond such as found in biphenyl) and the other linking groups shown in U.S. Pat. No. 3,528,098 (which is incorporated by reference herein for its disclosures in this regard). Hydrocarbyloxa, hydrocarbylthia and mixed hydrocarbyloxathia substituents are also possible where the hydrocarbyl groups are typically lower alkylene moieties. Such are often made from glycols, dithiols, epoxides and episulfides. Often the furazan oxide is a benzofurazan oxide of the formula

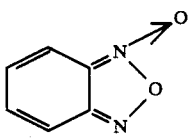

(II)

wherein none, one or any two of the ring positions can be substituted with lower hydrocarbyl, halogen, lower hydrocarbyloxy, lower hydrocarbylthio, lower hydrocarbyl carbonyl, carbonyl lower hydrocarbyloxy, nitro, amine or amino groups. Typically, the furazan oxide is benzofurazan oxide or the methyl or methoxy analog thereof.

Methods for preparing, purifying and handling these compounds are known to the art as is shown by the references cited hereinabove. The preparation of halogenated benzofurazan oxides and other substituted derivatives is described by Boulton et al in *J. Chem. Soc.* (1965) 5958. Benzotri (furazan oxide) can be prepared by the method described by Barley and Case in *Tetrahedron*, 3 (1958) 113. It should be noted that some of these furazan oxides, particularly those containing relatively large amounts of nitrogen and oxygen, such as benzotri (furazan oxide) and 4,6-di-(nitro)benzofurazan oxide, are prone to rapid decomposition to the point of explosions; all may be physiologically active to varying degrees. Therefore, care in their handling and use should be exercised.

A variety of transition metal salts can be utilized in the invention to reduce the undesirable odors resulting from the use of the aromatic furazan oxide. The transition metal salts also improve the processability of the rubber-furazan oxide mixtures and typically result in some improved properties.

The transition metal salts may be of the organic or inorganic types although certain organic salts are preferred. It also is preferred that the transition metal salts be soluble in or compatible with the rubber mixtures, and rubber soluble (hydrocarbon soluble) transition metal salts are most preferred since these are the salts most easily dispersed in the rubber mixtures. When insoluble salts are used, mixing of the ingredients takes longer and requires more energy. The inorganic salts which may be used include, for example, the halides, sulfates, carbonates, phosphates, etc. Organic salts include those derived, for example, from sulfonic acids, carboxylic acids, phosphonic acids, boronic acids, etc. Salts of carboxylic acids are preferred, and these include, for example, cobalt propionate, cobalt butylate, cobalt hexoate, nickel propionate, nickel octoate, iron octoate, etc.

Most preferably, the transition metal salts utilized in the present invention are hydrocarbon or rubber-soluble and typically are salts of organic carboxylic acids. The transition metal generally is from the first transition series. Thus, the metal may be scandium, titanium, vanadium, chromium, manganese, iron, cobalt or nickel. Of these, cobalt, iron, manganese and nickel are preferred. The transition metal salts useful in the present invention can be the normal or the basic salts of organic carboxylic acids, and are preferably salts of one or more aliphatic or alicyclic monocarboxylic acids. Since the transition metal salts are preferably hydrocarbon-soluble, the monocarboxylic acids should be selected to provide the desired solubility. Accordingly, the monocarboxylic acids generally will contain at least two or three carbon atoms and more preferably will contain from about six to 20 or 30 carbon atoms. The transition metal salts can be prepared from a single monocarboxylic acid or a mixture of carboxylic acids. Examples of monocarboxylic acids which can be used to prepare the soluble metal salts useful in the invention include heptanoic acid, ethyl-hexanoic acid, neodecanoic acid, stearic acid, oleic acid, napthenic acid, tall oil acid, and other natural and synthetic acids and acid mixtures. When more than one monocarboxylic acid is utilized, the additional acids can include lower molecular weight acids such as formic, acetic, propionic and butyric acids.

Some specific examples of the salts useful in the invention include cobalt palmitate, cobalt octoate, cobalt oleate, cobalt neodecanoate, cobalt naphthenate, cobalt stearate, iron octoate, iron neodecanoate, iron naphthenate, nickel octoate, nickel neodecanoate, nickel naphthenate, nickel stearate, manganese octoate, manganese neodecanoate, manganese naphthenate, manganese stearate, titanium octoate, titanium stearate, vanadium stearate, vanadium naphthenate, etc. Mixtures include, for example, cobalt naphthenate and cobalt propionate, and the cobalt salt of a mixture of neodecanoic and propionic acids.

As mentioned above, the salts may be either normal salts or basic salts. The basic salts have a stoichiometric excess of the metal relative to the acid as compared with neutral or normal metal salts of the acid. For example, solutions of normal cobalt salts of monocarboxylic acids such as neodecanoic acid contain about 6% cobalt whereas a solution of a basic cobalt neodecanoate can contain up to about 26% or more of cobalt. A discussion of the preparation of basic cobalt salts, particularly cobaltous neodecanoate is contained in U.S. Pat. No. 3,723,152. Highly overbased cobalt, iron, nickel and manganese compositions containing as much as 60% of the metal also are useful in the invention. The highly overbased cobalt, iron, nickel and manganese compositions consist essentially of a metal oxide and a hydroxyl-metal-carboxylate or -sulfonate complex wherein the metal content is in chemical combination partly with oxygen in a polynuclear metal oxide crystallite core and partly with at least two different aliphatic or alicyclic monocarboxylic acids or a mixture of one or more aliphatic or alicyclic monocarboxylic and aliphatic or aromatic monosulfonic acids containing at least two carbon atoms as hydroxyl-metal-carboxylate and hydroxy-metal-sulfonate groups, at least one of the acids being a monocarboxylic acid containing at least seven carbon atoms, and when the second acid is also a monocarboxylic acid, the second acid contains a number of carbon atoms in its longest chain differing by at least two carbon atoms from the total number of carbon atoms in the other, at least a portion of the carboxylate and sulfonate groups being hydrogen-bonded to oxygen atoms of the core, and the remainder of the carboxylate and sulfonate groups are unbonded and in equilibrium with the bonded groups, and the ratio of total metal moles to the total moles of organic acid is greater than one. Such overbased compositions are described in U.S. Pat. No. 4,162,986, and the disclosure of said patent is hereby incorporated by reference.

The transition metal salts useful in the present invention may contain more than one metal and may also contain in addition to the transition metal, aluminum or boron. Metal-organic salts containing both transition metals and aluminum or boron are described in British Patent No. 972,084. Such metal-organic salts are obtained by condensing alkoxides or aryl oxides of aluminum or boron with acyloxides of transition metals or transition metal radicals. The disclosure of British Patent No. 972,804 which describes the preparation of such transition metal organic compounds is hereby incorporated by reference. Specific examples of such transition metal organic compounds also containing boron or aluminum include the composition available from Manchem Ltd. under the general trade designation Manobond C which is believed to be a cobalt boron acylate wherein the acylate portion contains about 10 carbon atoms. The corresponding nickel boron acylate and iron boron acylate also are useful in the present invention and are available from Manchem Ltd.

The reinforcing fillers included in the uncured rubber compositions of the invention are those normally used in rubber compounding. Preferably the filler is carbon black, silica, or a mixture of carbon black and silica.

The carbon blacks include any of the commonly available, commercially-produced carbon blacks but those having a surface area (EMSA) of at least 20 $m^2/g$. and more preferably at least 35 $m^2/g$. up to 200 $m^2/g$. or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following Table I.

TABLE I

| Carbon Blacks | |
|---|---|
| ASTM Designation (D-1765-82a) | Surface Area ($m^2/g$) (D-3765) |
| N-110 | 126 |
| N-220 | 111 |
| N-339 | 95 |
| N-330 | 83 |
| N-550 | 42 |
| N-660 | 35 |

The carbon blacks utilized in the preparation of the filled vulcanizates of the invention may be in pelletized form or an unpelletized flocculant mass. Preferably, for more uniform mixing, unpelletized carbon black is preferred.

The process of the present invention involves preparing a mixture of the polymer rubber composition, the aromatic furazan oxide and the transition metal salt and the reinforcing filler, and mechanically compounding the mixture. Generally the temperature rises during the compounding operation and the temperature may be as high as 150°-200° C. The mixture can be heated if necessary to reach this temperature. The relative amounts of the rubber and aromatic furazan oxide can be varied, although the mixture generally will contain up to about 10% by weight of the aromatic furazan oxide based on the weight of the rubber. Preferably, the mixture will contain less than 5% of the furazan oxide since excessive amounts of the furazan oxide may result in formation of modified rubbers having undesirable properties such as higher hysteresis due to cleavages of the rubber molecules. More generally, from about 0.5 to 2 parts by weight of the aromatic furazan oxide, based on 100 parts by weight of the rubber will be incorporated into the reaction mixture.

The amount of transition metal salt included in the reaction mixture may be in the amount up to 10% by weight based on the weight of the rubber although amounts of from about 0.5 to 5 parts and more preferably from about 0.5 to 2 parts generally are used. Often, the amount of the transition metal salt included in the mixture will be equal to the amount of aromatic furazan oxide included in the mixture.

The amount of reinforcing filler included in the mixture is an amount generally used in such rubber system. This amount may range from about 30 to 150 parts by weight per 100 parts of rubber (phr).

The mixtures used in the process of the invention can be prepared by first mixing the polymer rubber with the transition metal salt and thereafter incorporating the aromatic furazan oxide and reinforcing filler, or the uncured polymer rubber can be mixed with the aromatic furazan oxide followed by the transition metal salt and filler. Alternatively, the transition metal salt and the aromatic furazan oxide can be added simultaneously to the uncured polymer rubber followed by the filler. Preferably, the transition metal salt is mixed with the rubber prior to the addition of the aromatic furazan oxide for maximum reduction of the undesirable odors.

The mechanism by which the undesirable odor is minimized by the addition of the transition metal salts is not known. It is believed, however, that the transition metal salts prevent the formation of odor-causing molecules by preventing the formation of the aromatic furazans. One decomposition product of aromatic furazan oxides which has been observed in rubber compositions characterized by undesirable odors is an aromatic furazan. The incorporation of the transition metal salts of the invention into the rubber compositions has been demonstrated to reduce the amount of aromatic furazan observed in both uncured rubber formulations and vulcanizates prepared from such uncured rubber formulations.

Normal processing rubber additives generally may be included in the mixture, typically after the filler. Examples of such additives include metal oxides, stearic acids, antioxidants, waxes, retarders, promoters, etc. It is desirable that the mixture of uncured rubber, aromatic furazan oxide and transition metal salt and filler (and optionally, conventional, compounding additives) be mechanically compounded in the absence of vulcanizing or curing agents and accelerators since such materials would result in premature curing.

The following examples illustrate the preparation of the uncured polymer rubber formulations of the invention. Unless otherwise indicated in the examples or elsewhere in the application, all parts and percentages are by weight, and the temperatures are in degrees centigrade.

UNCURED MASTERBATCH PREPARATION

In the following examples, an internal mixer, such as a Brabender or small size Banbury mixer is used. The usual technique is to add various materials in the given order, often in portions, to the mixer and to continue mixing for the indicated period of time. Further additions following by mixing are then made to the masterbatches thus prepared. The standard technique is according to the following schedule.

| Time (min) | Add to Mixer |
|---|---|
| 0 | Polymer, 100 parts |
| 0.5 | Transition metal salt* |
| 1.0 | Aromatic furazan oxide* |
| 1.5–2 | Filler plus zinc oxide plus stearic acid |
| 3 | Processing oil |
| 6.0 | Drop mixed composition at 160° C. to 190° C. |

*Order of addition of these two materials can be reversed.

The uncured masterbatch which is then banded and sheeted on a small twin roll mill set at 60 gauge.

TABLE II

| | Cobalt Salt Mixture | | | | |
|---|---|---|---|---|---|
| Example | 1 | 2 | 3 | 4 | 5 |
| SBR (47.5% solids) | 137.5 | 137.5 | 137.5 | 137.5 | 137.5 |
| BFO (20% solvent) | 0 | 1.25 | 1.25 | 1.25 | 1.25 |
| Cobalt boron acylate | 0 | 0 | 0.25 | 0.50 | 1.0 |
| N-339 black | 63 | 63 | 63 | 63 | 63 |
| ZnO | 4 | 4 | 4 | 4 | 4 |
| Stearic acid | 1.6 | 1.6 | 1.6 | 1.6 | 1.6 |

TABLE III

| | Nickel Salt Mixture | | | | |
|---|---|---|---|---|---|
| Example | 6 | 7 | 8 | 9 | 10 |
| SBR | 137.5 | 137.5 | 137.5 | 137.5 | 137.5 |
| BFO | 0 | 1.25 | 1.25 | 1.25 | 1.25 |
| Nickel boron acylate | 0 | 0 | 0.5 | 0.75 | 1.0 |
| N-339 black | 63 | 63 | 63 | 63 | 63 |
| ZnO | 4 | 4 | 4 | 4 | 4 |
| Stearic acid | 1.6 | 1.6 | 1.6 | 1.6 | 1.6 |

TABLE IV

| | Iron Salt Mixture | | | |
|---|---|---|---|---|
| Example | 11 | 12 | 13 | 14 |
| SBR | 137.5 | 137.5 | 137.5 | 137.5 |
| BFO | 0 | 1.25 | 1.25 | 1.25 |
| Iron boron acylate | 0 | 0 | 0.5 | 1.0 |
| N-339 black | 63 | 63 | 63 | 63 |
| ZnO | 4 | 4 | 4 | 4 |
| Stearic acid | 1.6 | 1.6 | 1.6 | 1.6 |

In the above examples, the processability of the mixtures appear to be improved by the inclusion of the transition metal salt.

When curing agents are mixed with the modified rubber compositions of the present invention, they may be conventional types such as sulfur- or peroxide-based curing systems. They are used in conventional amounts and incorporated in the uncured compositions of the invention by known techniques and procedures. Fillers (in addition to carbon black and silica) may be, and often are present as is known to those skilled in the art. Typical fillers include glass, talc and similar finely divided mineral materials.

The vulcanizable compositions containing the modified rubbers of the present invention can be prepared by conventional techniques in using various types of mills, blenders and mixers known in the art. The cured compositions can be made by the same techniques followed by curing.

The temperature used in formulating the rubber compositions of this invention range from ambient to those normally used in the art such as 75° to 175° or even higher depending upon a particular modified rubber composition being processed. Because of the shear forces involved in formulating the rubber compositions, the formulation process heat is generated and high temperatures are normal.

The vulcanizates of the present invention are made by vulcanizing a mixture comprising at least one of the above-described polymer rubber compositions, the aromatic furazan oxide, the transition metal salt, fillers, conventional curing systems and agents such as sulfur, antioxidants, accelerators, retarders, coupling agents, promoters, etc. The vulcanizates of this invention are prepared by curing these under conditions of temperature and time customarily used in the art. Typically, the rubber, furazan oxide, transition metal salt, carbon black and other fillers and compounding agents are mixed, the sulfur and accelerators are added, and the mixture is cured. Other mixing sequences can be used, but it is essential to have the rubber furazan oxide and transition metal, carbon black mixture prepared before vulcanization.

The following examples illustrate the preparation of vulcanized rubber compositions of the invention. Conventional rubber compounding materials, conditions, temperatures, procedures and evaluation techniques are used unless noted to the contrary.

EXAMPLE A

To the entire mixture prepared in Example 1, there is added 1.0 parts of an accelerator and 3.83 parts of sulfur. Mixing is conducted in an internal mixer for a total mixing period of about two minutes and the mixture is dropped at a temperature of about 100°–120° C.

EXAMPLES B–N

In Examples B–N, the procedure of Example A is repeated substituting the products of Examples 2–14 respectively.

The physical properties of the vulcanizates prepared in Examples A–N are summarized in Tables V–VII. As can be seen from the analyses of the amount of benzofurazan in the vulcanizates prepared in accordance with the invention, the incorporation of the metal salt into the vulcanizable mixture significantly reduces the amount of the undesirable benzofurazan formed. A reduction in the undesirable odor of both the uncured rubber formulations and the vulcanizates is observed. The compositions prepared in accordance with the present invention also exhibit higher rebound and reduced hysteresis when compared to rubber formulations which have not been modified with the aromatic furazan oxide and the transition metal salt.

TABLE V

| | Physical Properties of Cured Stock Modified With Cobalt | | | | |
|---|---|---|---|---|---|
| Example | A | B | C | D | E |
| % BFZ | N/D* | 0.27 | 0.023 | 0.0005 | <0.0005 |
| % BFO | N/D | 0.003 | 0.006 | N/D | N/D |
| Monsanto Rheometer (300° F.) | | | | | |
| TS (2) | 17.0 | 15.3 | 16.5 | 15.0 | 12.5 |
| TC (90) | 29.5 | 30.0 | 32.0 | 31.7 | 32.5 |
| Max. Torque | 41.4 | 42.0 | 41.8 | 42.0 | 44.8 |
| Rebound (%) | | | | | |
| at 73° F. | 40 | 44 | 45 | 45 | 44 |
| at 212° F. | 63 | 68 | 68.5 | 67 | 67 |
| MTS 7% def. 10# 10 HZ (73° F.) | | | | | |
| K' | 1160 | 1050 | 1070 | 1130 | 1220 |
| K" | 286 | 202 | 201 | 220 | 239 |
| Tan delta | 0.246 | 0.192 | 0.188 | 0.195 | 0.196 |

*N/D = none detected.

TABLE VI

| | Physical Properties of Cured Stock Modified With Nickel | | | | |
|---|---|---|---|---|---|
| Example | F | G | H | I | J |
| % BFO | N/D | 0.015 | N/D | 0.003(?) | N/D |
| % BFZ | N/D | 0.156 | 0.083 | 0.067 | 0.037 |
| MTS Tan delta | | | | | |
| at 73° F. | 0.222 | 0.168 | 0.175 | 0.177 | 0.189 |
| ML/4 at 100° C. | 67 | 89 | 67 | 66 | 63 |

TABLE VII

| | Physical Properties of Cured Stock Modified With Iron | | | |
|---|---|---|---|---|
| Example | K | L | M | N |
| % BFZ | N/D | 0.015 | 0.009 | 0.006 |
| % BFO | N/D | 0.006 | 0.002 | 0.001 |
| Monsanto Rheometer (300° F.) | | | | |
| TS (2) | 14.5 | 14.3 | 14.0 | 14.5 |
| TC (90) | 32.5 | 29.7 | 29.8 | 41.2 |
| Max. Torque | 44.6 | 44.5 | 42.8 | 41.2 |
| Rebound (%) | | | | |
| at 73° F. | 37 | 41 | 39.5 | 40 |
| at 212° F. | 66 | 70 | 68 | 67 |
| MTS 7% def. 10# 10 HZ (73° F.) | | | | |
| K' | 1220 | 1140 | 1160 | 1140 |
| K" | 276 | 220 | 236 | 241 |
| Tan delta | 0.226 | 0.193 | 0.203 | 0.211 |

The vulcanizable rubber compositions of the invention can be molded or shaped into desired shapes by known techniques and they can be used for many purposes for which similar compositions are used. For example, they can be used for tire tubes, tire treads, tire casings, shoe soles and heels, raincoats, table covers, hose for transmission fluids, belts, printer rolls, printer's blankets, engraving plates, battery cases, etc. The use in tire stock is particularly preferred.

Among the desirable and beneficial properties exhibited by the unvulcanized and vulcanized rubber compositions of the invention, in addition to the decrease in undesirable odor often associated with aromatic furazan oxides, are improved processability of the uncured formulations, an increase in rebound, a decrease in hysteresis, and when the compositions are used in the treads of tires, the tires exhibit improved desirable properties such as a decrease in rolling resistance. This desirable property is illustrated in the following example.

EXAMPLE O

SBR/NR passenger tread stocks containing benzofurazan oxide and nickel boron acylate (NBA) were prepared in the normal manner with a typical formulation. Control tread stocks also were prepared from the same formulation except that Control-1 contained no benzofurazan oxide or nickel salt, and Control-2 contained benzofurazan oxide, but no nickel salt.

Batches of each formulation were mixed using a drop temperature of 182°–194° C. which required about six minutes of mixing time. No BFZ odor was detected in the stock containing both the BFO and the NBA.

The utility of the compositions of the present invention as tread stocks used for preparing tires characterized by improved rolling resistance is illustrated as follows. Treads and tires were prepared utilizing the composition of Example O. Similar treads and tires also were prepared utilizing control samples 1 and 2 described in Example O. The tread stocks were laminated into treads for radial tires, and the treads were applied to production carcases. The Control-2 treads showed significantly more shrinkage than Control-1. However, the Example O treads showed less shrinkage than either control. The rolling resistance and cornering force data for the tires were taken from a drum analysis. The Control-1 specification showed a 9% reduction and rolling resistance with no loss in cornering force, and the Example O formulation showed a 7.7% reduction in rolling resistance with a very slight reduction in cornering force.

The rolling resistance of the tires also was determined using the Clayton twin roll. In this test, the Control-2 formulation containing BFO resulted in a 12% reduction in rolling resistance, and the tires prepared with the rubber formulation of Example O (the invention) containing BFO and NBA exhibited a 14% reduction in rolling resistance.

While the invention has been described and exemplified herein by reference to specific materials, machinery, techniques, procedures and examples, it is understood that it is not restricted to any of these, and numerous variations, combinations and permutations can be made within the scope of the invention as is clear to those skilled in the art.

We claim:

1. A process for improving the properties of uncured polymer rubber formulations containing aromatic furazan oxides which comprises
   (a) preparing a mixture comprising
      (i) at least one uncured polymer rubber containing an unsaturated carbon chain,
      (ii) at least one furazan oxide of the partial formula

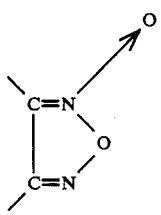

(I)

wherein the depicted carbon atoms are part of a single fused aromatic ring,
      (iii) an odor-reducing amount of at least one transition metal salt of an organic carboxylic acid, and
      (iv) at least one reinforcing filler, and
   (b) mechanically compounding the mixture at a temperature of up to about 200° C.

2. The process of claim 1 wherein the transition metal salt (iii) is soluble in the uncured polymer rubber.

3. The process of claim 2 wherein the carboxylic acid is an aliphatic or alicyclic monocarboxylic acid.

4. The process of claim 1 wherein the transition metal of the transition metal salt is nickel, cobalt, iron, manganese, chromium, vanadium, titanium or scandium.

5. The process of claim 1 wherein the transition metal salt also contains aluminum or boron.

6. The process of claim 1 wherein the uncured rubber is NR, IR, BR, SBR, CR, CIIR, NIR or a mixture of two or more of said rubbers.

7. The process of claim 6 wherein the uncured rubber is NR, SBR or a mixture containing at least about 50% of one of these.

8. The process of claim 1 wherein the furazan oxide is of the formula

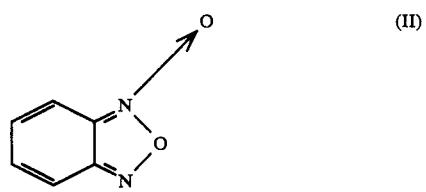

(II)

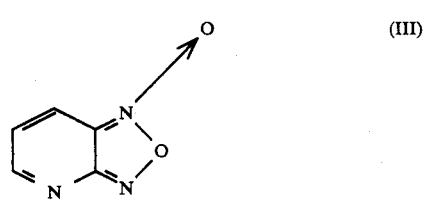

(III)

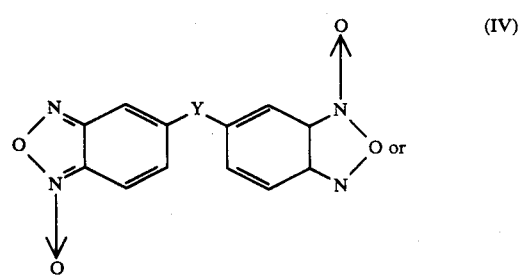

(IV)

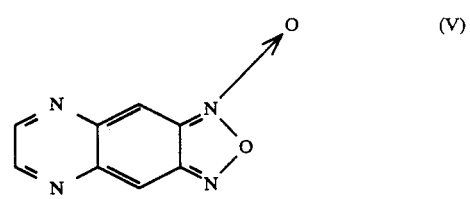

(V)

wherein none, one or any two of the ring positions can be substituted with lower hydrocarbyl, halogen, hydroxyl, lower hydrocarbyl oxy, lower hydrocarbyl thio, lower hydrocarbylthia-, -oxa, and -thia, -oxa, lower hydrocarbyl carbonyl, carbonyl lower hydrocarbyl oxy, nitro, amine or amino groups and Y is a linking atom or group.

9. The process of claim 1 wherein the furazan oxide is of the formula

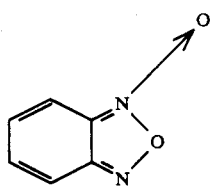

wherein none, one or any two of ring positions can be substituted with lower hydrocarbyl, halogen, hydroxyl lower hydrocarbyl oxy, lower hydrocarbyl thio, lower hydrocarbyl carbonyl, carbonyl lower hydrocarbyl oxy, nitro, amine or amino groups.

10. The process of claim 1 conducted in the absence of vulcanizing agents.

11. The process of claim 1 wherein the reinforcing filler is at least one carbon black.

12. The process of claim 11 wherein the carbon black has a surface area of at least 20 m²/g.

13. A process for improving the properties and reducing the odor of uncured polymer rubbers containing furazan oxides, and vulcanized rubbers prepared therefrom, which comprises
   (a) preparing a mixture comprising
      (i) at least one uncured polymer rubber containing an unsaturated carbon chain,
      (ii) at least one furazan oxide is of the formula

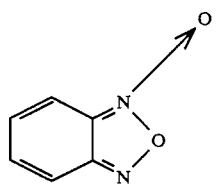

wherein none, one or any two of ring positions can be substituted with lower hydrocarbyl, halogen, hydroxyl lower hydrocarbyl oxy, lower hydrocarbyl thio, lower hydrocarbyl carbonyl, carbonyl lower hydrocarbyl oxy, nitro, amine or amino groups,
      (iii) an odor-reducing amount of at least one hydrocarbon-soluble transition metal salt of an organic carboxylic acid, and
      (iv) carbon black, and
   (b) mechanically compounding said mixture at a temperature of up to about 200° C.

14. The process of claim 13 wherein the transition metal salt is hydrocarbon-soluble.

15. The process of claim 13 wherein the transition metal of the transition metal salt is nickel, cobalt or iron.

16. The process of claim 13 wherein the organic carboxylic acid is an aliphatic or alicyclic organic carboxylic acid.

17. The process of claim 13 wherein the rubber (a) is NR, IR, BR, SBR, CR, CIIR, NIR or a mixture of two or more of said rubbers.

18. The process of claim 17 wherein the rubber is NR, SBR or a mixture containing at least about 50% of one of these.

19. The process of claim 13 wherein the furazan oxide is benzofurazan oxide or a methyl or methoxy analog thereof.

20. The process of claim 13 wherein the carbon black has a surface area of at least 20m²/g.

21. The product obtained by the process of claim 1.

22. The product obtained by the process of claim 13.

23. A process for improving the properties of uncured polymer rubber formulations containing aromatic furazan oxides which comprises
   (a) preparing a mixture comprising
      (i) at least one uncured polymer rubber containing an unsaturated carbon chain,
      (ii) at least one furazan oxide of the partial formula

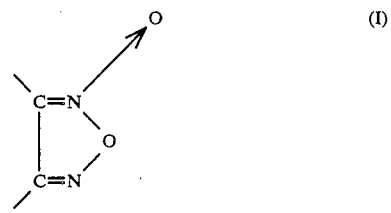

wherein the depicted carbon atoms are part of a single fused aromatic ring,
      (iii) up to about 10% by weight based on the weight of the uncured rubber of at least one transition metal salt, and
      (iv) at least one reinforcing filler, and
   (b) mechanically compounding the mixture at a temperature of up to about 200° C.

24. The process of claim 23 wherein the transition metal salt (3) is at least one salt of an organic carboxylic acid.

25. The process of claim 23 wherein the transition metal of the transition metal salt is nickel, cobalt, iron, manganese, chromium, vanadium, titanium or scandium.

26. The process of claim 23 wherein the furazan oxide is of the formula

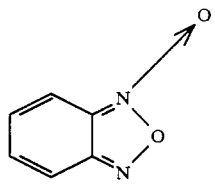

wherein none, one or any two of ring positions can be substituted with lower hydrocarbyl, halogen, hydroxyl, lower hydrocarbyl oxy, lower hydrocarbyl thio, lower hydrocarbyl carbonyl, carbonyl lower hydrocarbyl oxy, nitro, amine or amino groups.

27. The process of claim 26 wherein the furazan oxide in benzofurazan oxide or a methyl or methoxy analog thereof.

28. The process of claim 23 wherein the uncured polymer rubber is NR, IR, BR, SBR, CR, CIIR, NIR or a mixture of two or more of said rubbers.

29. The process of claim 23 wherein the uncured polymer rubber is NR, SBR or a mixture containing at least about 50% of one of these.

* * * * *